United States Patent [19]

Brandyberry et al.

[11] Patent Number: 4,650,531

[45] Date of Patent: Mar. 17, 1987

[54] METHOD OF MAKING A METALLIC CABLE

[75] Inventors: Dennis R. Brandyberry, Canton; Grover W. Rye, Northampton, both of Ohio

[73] Assignee: The Goodyear Tire & Rubber Company, Akron, Ohio

[21] Appl. No.: 700,440

[22] Filed: Feb. 11, 1985

[51] Int. Cl.$^4$ ............................................. B32B 31/08
[52] U.S. Cl. ...................................... 156/166; 57/362; 57/902; 156/291; 428/371; 428/379
[58] Field of Search ................... 156/52, 55, 296, 117, 156/166, 291; 174/117 F, 128 R; 57/902, 362; 140/149; 428/371, 377, 329

[56] References Cited

U.S. PATENT DOCUMENTS

| | | | |
|---|---|---|---|
| 3,700,012 | 10/1972 | Alderfer | 140/149 |
| 3,763,683 | 10/1973 | Alderfer | 72/77 |
| 4,022,009 | 5/1977 | van Assendelft | 428/592 X |
| 4,195,469 | 4/1980 | Tarantola | 140/149 X |
| 4,381,208 | 4/1983 | Baverstock | 156/52 |
| 4,495,759 | 1/1985 | Brandyberry et al. | 57/58.52 |
| 4,516,395 | 5/1985 | Palmer et al. | 57/237 |

Primary Examiner—Robert A. Dawson
Attorney, Agent, or Firm—L. R. Drayer

[57] ABSTRACT

A method of making metallic cable (10) suitable for reinforcing elastomeric articles which comprises two or more substantially identical helical formed filaments (11, 12, 13) nested together and secured to one another by axially spaced apart applications of an adhesive substance.

3 Claims, 3 Drawing Figures

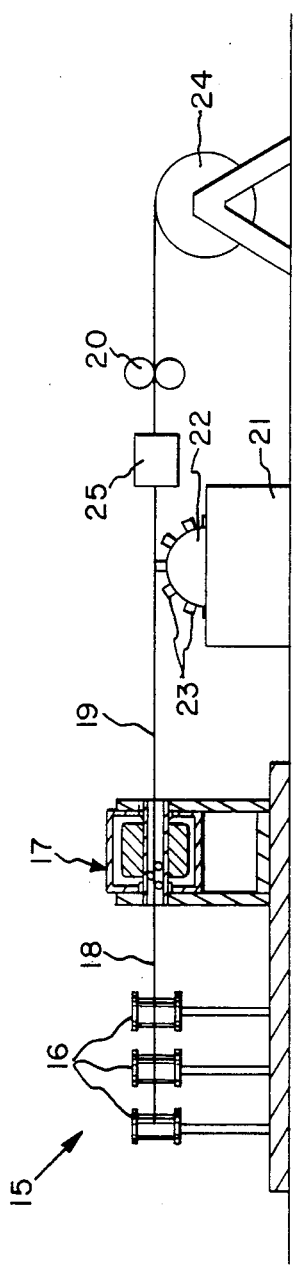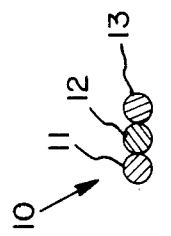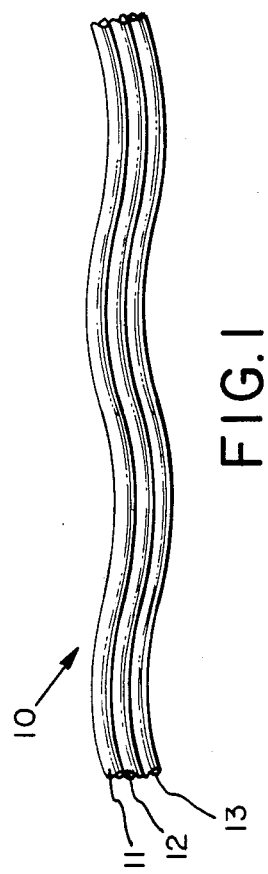

METHOD OF MAKING A METALLIC CABLE

BACKGROUND OF THE INVENTION

This invention relates generally to metallic cables, and more specifically to a cable structure suitable for reinforcing elastomeric articles and an apparatus and method for manufacturing a cable having this structure.

One of the problems that has been encountered with elastomeric articles that are reinforced with metallic cables is the propagation of corrosion along the length of the cable in the event that the article is cut or torn such that the reinforcing cable is exposed. One approach to solving the problem of corrosion propagation has been to make a very compact metallic cable, so that there are minimum interstices between the filaments comprising the cable which could serve as pathways for the spread of corrosion. A second approach has been to make a cable with a very open construction, so that the elastomeric material in which the cable is embedded can substantially surround each filament making up the cable. The present invention is concerned with the second approach.

U.S. Pat. Nos. 3,700,012 and 3,763,683 teach a method and apparatus for providing a cable comprising helically formed wire filaments that are nested in bundles and encapsulated in an elastomeric material to form a reinforced fabric. These patents teach a structure comprising wire filaments which are not twisted about one another and have no wrapping filament holding the helically formed filaments together, so this prior art structure must be immediately encapsulated in an elastomeric material as a part of the manufacturing process. The inability to store this prior art wire structure on spools means that each production line must comprise both a cable forming apparatus and an apparatus for encapsulating the cable in an elastomeric material such as a calender. Such a production line has the disadvantages that it is very expensive to manufacture, and may require an inordinately long set-up time between production runs.

A metallic cable according to the present invention may be collected and stored upon a spool, which eliminates the need for an in-line calender without twisting of the cable. Advantages of the present invention are: (a) efficient and low cost manufacturing of the metallic cable: (b) the capacity to provide a substantially flat cable to facilitate a thinner final product (such as conveyor belts): (c) better control of the spacing between filaments in the cable which reduces or eliminates fretting contact: and (d) better coverage of the filaments by elastomers which reduces corrosion in the final product.

There is provided in accordance with one aspect of the invention a metallic cable comprising a plurality of substantially identical metallic filaments formed into helixes, said plurality of filaments not being twisted about one another and not having any other filament wrapped thereabout, said plurality of filaments being adhered to one another by a plurality of applications of an adhesive substance, said applications being spaced apart from one another with respect to a longitudinal axis of said cable.

There is provided in accordance with another aspect of the invention a method of manufacturing a metallic cable comprising the steps of:

(a) providing a plurality of substantially identical metallic filaments formed into helixes:

(b) arranging said metallic filaments beside one another without twisting them about one another and without wrapping any other filament around said plurality of filaments: and (c) applying an adhesive substance to said plurality of filaments in a plurality of locations that are spaced apart with respect to the longitudinal axis of said cable.

There is provided in accordance with yet another aspect of the invention an apparatus for manufacturing a metallic cable of the type disclosed herein comprising:

(a) a bobbin means for supplying a plurality of metallic filaments;

(b) a means for simultaneously deforming a plurality of metallic filaments by imparting a helical shape thereto;

(c) a reservoir for an adhesive substance, and a transfer mechanism for intermittently applying said adhesive to a metallic cable moving past said reservoir and transfer mechanism in a direction parallel to the longitudinal axis of said metallic cable;

(d) a spool means for collecting the cable; and (e) a drawing means for pulling the filaments from said bobbin means, through the means for helically deforming the filaments, past the mechanism for applying an adhesive, and to said spool means.

BRIEF DESCRIPTION OF THE DRAWING

The invention will be better understood by referring to the figures of the drawing, wherein:

FIG. 1 is a side elevation view of a cable made in accordance with the invention;

FIG. 2 is a cross-sectional view of the cable illustrated in FIG. 1; and

FIG. 3 is a schematic representation of a side view of an apparatus for manufacturing a cable in accordance with the invention.

DETAILED DESCRIPTION OF THE INVENTION

Referring first to FIGS. 1 and 2, there is shown a metallic cable 10 suitable for reinforcing elastomeric articles, such as tires, belts and hoses. The metallic cable 10 comprises a plurality of substantially identical metallic filaments 11,12,13 that are formed into helixes and positioned beside each other. While the metallic cable illustrated in FIG. 1 comprises three filaments, it is understood to be only an example and that a cable according to the invention may comprise two or more filaments.

As used herein, a "filament" refers to an individual metallic wire, and a "cable" refers to a group of filaments combined together to form a structure. It is preferred that the individual filaments have a diameter in the range of between 0.15 mm and 0.30 mm. However, it is understood that filaments having diameters outside of the preferred range may be used to manufacture a cable according to the invention.

The helixes formed by each of the substantially identical filaments 11,12,13 have a "pitch length" which is the axial distance required for a helically formed filament to make one 360 degree revolution around the longitudinal axis of the helix. For filaments having diameters in the preferred range, the preferred pitch length of the helixes is between 10 mm and 18 mm.

The helixes formed by each of the filaments 11, 12, 13 each has a longitudinal axis, and preferably said longitudinal axes are parallel to one another. As shown in a cross-sectional view in FIG. 2, it is preferred that the axes of the helixes be coplanar so that a substantially flat, and thin, cable is provided.

In manufacturing a cable according to the invention, the individual filaments 11,12,13 are first deformed into substantially identical helical configurations and nested together as described above. An adhesive substance is then intermittently applied to the filaments to bond them to one another. The isolated applications of an adhesive substance are spaced apart with respect to the longitudinal axis of the cable. Preferably the distance between the applications of adhesive is at least two and one-half times the pitch length of the helixes formed by the filaments. The adhesive substance should be chemically compatible with the elastomeric matrix that the cable will be embedded in as a reinforcing member. Examples of such adhesives include a rubber base cement, an epoxy based system, and a urethane based system, but any suitable adhesive may be used.

A schematic representation of a side view of an apparatus 15 for manufacturing a metallic cable according to the invention is shown in FIG. 3. The apparatus has a bobbin means 16 for supplying a plurality of individual metallic filaments. A means 17 for simultaneously deforming a plurality of metallic filaments imparts a helical shape to the parallel and adjacent filaments 18. Preferably the means for deforming filaments 17 comprises an electric motor having a hollow armature shaft with forming pins attached to the inside of the hollow armature shaft. After passing through the means for deforming filaments, the cable 19 comprises helical formed filaments that are nested together as described above. Obviously, if not maintained under tension by a means for drawing 20, such as a capstan, the filaments would become separated from one another. The filaments could be maintained in a fixed relationship by twisting them together, which changes the mechanical properties of the cable, or by immediately embedding them in an elastomeric substance, which presents disadvantages that were discussed in the introductory paragraphs of this specification. Instead, the apparatus has a reservoir 21 for an adhesive substance communicating with a transfer mechanism 22 for intermittently applying an adhesive substance to the cable, while the cable is moving past the reservoir and transfer mechanism.

As shown in FIG. 3, the transfer mechanism 22 may comprise a transfer wheel with circumferentially spaced apart adhesive carrying members 23, such as brushes. Alternatively, the transfer mechanism may be a sprayer that operates intermittently. The spacing between applications of adhesive is controlled by the axial speed of the cable as a function of the rotational speed of the transfer wheel 22, or the frequency at which a sprayer sprays short bursts of adhesive.

Unless the adhesive selected has a very short curing or drying time at room temperature, a heat source 25 should be disposed such that it applies heat to the cable after the adhesive is applied, but before the cable is collected upon the spool means 24. The heat source could comprise, for example, hot air blown upon the cable, or radiated heat from resistor coils.

The cable that has been collected upon a spool can be stored until it is needed, and then embedded in an elastomeric substance by using a creel calender of the type well known in the tire and rubber manufacturing arts. The adhesive substance applied to the cable only has to maintain the filaments in a fixed position through the calendering process, since after that the elastomeric substance encapsulating the cable will hold the filaments in place. Therefore, the long term adhesive properties of the adhesive substance to the metallic filaments are not believed to be as important as the compatibility of the adhesive substance to the elastomeric matrix.

While certain representative details and embodiments have been shown for the purpose of illustrating the invention, it will be apparent to those skilled in the art that various changes and modifications may be made therein without departing from the spirit or scope of the invention.

What is claimed is:

1. A method of manufacturing a metallic cable comprising the steps of:
   (a) providing a plurality of substantially identical metallic filaments formed into helixes;
   (b) arranging said metallic filaments beside one another without twisting them about one another and without wrapping any other filament around said plurality of filaments;
   (c) applying an adhesive substance to said plurality of filaments in a plurality of locations that are spaced apart with respect to the longitudinal axis of said cable; and
   (d) collecting the cable manufactured upon a spool means and then later embedding the cable in an elastomeric substance.

2. A method of manufacturing a metallic cable according to claim 1 wherein said filaments are arranged such that the longitudinal axes of the helixes formed by said filaments are substantially parallel to one another.

3. A method of manufacturing a metallic cable according to claim 2 wherein said filaments are arranged such that the longitudinal axes of the helixes formed by said filaments are coplanar.

* * * * *